(12) United States Patent
Takayama et al.

(10) Patent No.: US 9,294,152 B2
(45) Date of Patent: *Mar. 22, 2016

(54) COMMUNICATION SYSTEM, COMMUNICATION APPARATUS AND COMMUNICATION METHOD AS WELL AS PROGRAM

(71) Applicant: Sony Corporation, Tokyo (JP)

(72) Inventors: Yoshihisa Takayama, Kanagawa (JP); Susumu Kusakabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,822

(22) Filed: Feb. 25, 2015

(65) Prior Publication Data

US 2015/0171929 A1 Jun. 18, 2015

Related U.S. Application Data

(63) Continuation of application No. 13/527,093, filed on Jun. 19, 2012, now Pat. No. 8,996,731, which is a continuation of application No. 10/557,272, filed as application No. PCT/JP2004/008169 on Jun. 4, 2004, now Pat. No. 8,244,917.

(30) Foreign Application Priority Data

Jun. 6, 2003 (JP) ................................. 2003-162427

(51) Int. Cl.
*G06F 13/00* (2006.01)
*H04B 5/00* (2006.01)
(Continued)

(52) U.S. Cl.
CPC ............. *H04B 5/0031* (2013.01); *H04W 36/14* (2013.01); *H04W 28/18* (2013.01); *H04W 84/18* (2013.01); *H04W 88/06* (2013.01)

(58) Field of Classification Search
CPC ............................. H04W 36/14; H04W 28/18
USPC ................................................................ 710/1
See application file for complete search history.

(56) References Cited

U.S. PATENT DOCUMENTS 5,412,375 A 5/1995 Wood
6,476,708 B1 11/2002 Johnson
(Continued)

FOREIGN PATENT DOCUMENTS

CN 1402858 3/2003
CN 1404672 3/2003
(Continued)

OTHER PUBLICATIONS

European Patent Office, Communication Pursuant to Article 94(3) EPC issued in connection with European Patent Application No. 04 736 125.8, dated Sep. 25, 2012. (10 pages).
(Continued)

*Primary Examiner* — Titus Wong
(74) *Attorney, Agent, or Firm* — K&L Gates LLP

(57) ABSTRACT

A communication system, a communication apparatus, a communication method, and a program for acquiring the advantage of a plurality of communication protocols is provided. A random number and a first communication information including first identification information of a communication apparatus is sent to another communication apparatus by using near field communication. Second communication information is received by the communication apparatus from the other communication apparatus by using near field communication. The second communication information includes second identification information of the other communication apparatus necessary to a second communication. The second communication is performed between the communication apparatus and the other communication apparatus by using the second communication information received by using the near field communication.

20 Claims, 16 Drawing Sheets

(51) Int. Cl.
*H04W 36/14* (2009.01)
*H04W 28/18* (2009.01)
*H04W 84/18* (2009.01)
*H04W 88/06* (2009.01)

(56) References Cited

U.S. PATENT DOCUMENTS

| | | |
|---|---|---|
| 6,577,229 B1 | 6/2003 | Bonneau et al. |
| 6,577,238 B1 | 6/2003 | Whitesmith et al. |
| 7,009,946 B1 | 3/2006 | Kardach |
| 7,110,823 B2 * | 9/2006 | Whitehurst et al. ............ 607/60 |
| 7,136,999 B1 | 11/2006 | Griffiths |
| 7,231,451 B2 | 6/2007 | Law |
| 7,236,742 B2 * | 6/2007 | Hall et al. ................. 455/41.3 |
| 2004/0067734 A1 | 4/2004 | Gunnarsson |
| 2013/0095762 A1 | 4/2013 | Inagaki et al. |

FOREIGN PATENT DOCUMENTS

| | | |
|---|---|---|
| EP | 1445908 | 8/2004 |
| WO | 01/45319 | 6/2001 |
| WO | 01/58108 | 8/2001 |
| WO | 03/009534 | 1/2003 |

OTHER PUBLICATIONS

Chinese Office Action issued Dec. 2, 2015, for corresponding Chinese Appln. No. 201310469828.7 (24 pages).

* cited by examiner

FIG. 6

| Start Mark (7E) | Address (FF) | Control (03) | Protocol (0001) | NFCIP-DL header | Data | CRC | End Mark (7E) |

FIG. 7

| Byte 1 | Byte 2 | Byte 3 | Byte 4 | Byte 5 | Byte 6 |
|--------|--------|--------|--------|--------|--------|
| 'N' (4E) | 'F' (46) | 'C' (43) | Version (21) | RFU (00) | Directive Code |

FIG. 9

| Length of PDU Data (n) | Current Phase | Status | Error Code | Media Pack Count | Media Parameter Pack | ....... | Media Parameter Pack |

FIG. 10

| Length of PDU Data (11) | Media Parameter Pack |
|---|---|

FIG. 11

| Length of PDU Data (04) | Current Phase | Satus | Error Code |
|---|---|---|---|

COMMUNICATION SYSTEM, COMMUNICATION APPARATUS AND COMMUNICATION METHOD AS WELL AS PROGRAM

CROSS-REFERENCE TO RELATED APPLICATIONS

The present application is a continuation of U.S. patent application Ser. No. 13/527,093, filed Jun. 19, 2012, which is a continuation of U.S. patent application Ser. No. 10/557,272 filed on Feb. 24, 2006, now U.S. Pat. No. 8,244,917, issued Aug. 14, 2012, which is a U.S. national phase of International Application Serial No. PCT/JP04/008169 filed Jun. 4, 2004, which claims priority to Japanese Application 2003-162427 filed Jun. 6, 2003, the entire contents of each of which are hereby incorporated by reference herein.

BACKGROUND

The present disclosure relates to a communication system, a communication apparatus, and a communication method as well as to a program, and in particular, to a communication system, a communication apparatus, and a communication method as well as to a program capable of acquiring the advantages of a plurality of communication protocols.

Recently, wireless communications, for example, Wireless Local Area Network (WLAN), Bluetooth (registered trademark) (hereinafter, appropriately abbreviated as BT communication), an integrated circuit (IC) card system, and the like have become a focus of attention.

In, for example, the IC card system among these wireless communications, a reader/writer generates an electromagnetic wave to thereby form a so-called radio frequency (RF) field (magnetic field). Then, when an IC card is brought into vicinity of the reader/writer, the IC card is supplied with power by electromagnetic induction as well as data is transmitted between the IC card and the reader/writer.

There are specifications called a type A and a type B as the specification of the IC card embodied at present.

The type A is employed as MIFARE system of Philips, and data is transmitted from a reader/writer to an IC card by encoding data by Miller, and data is transmitted from the IC card to the reader/writer by encoding data by Manchester. Further, the type A employs 106 kilobyte per second (kbps) as a data transmission rate.

In the type B, data is transmitted from a reader/writer to an IC card by encoding data by NRZ, and data is transmitted from the IC card to the reader/writer by encoding data by NRZ-L. Further, the type B employs 106 kbps as a data transmission rate.

Further, as the IC card, there is proposed a system for selecting a communication protocol to be used from a plurality of communication protocols and executing a communication by the selected communication protocol (refer to, for example, Japanese Unexamined Patent Application Publication No. 06-276249).

Incidentally, in the IC card system disclosed in Japanese Unexamined Patent Application Publication No. 06-276249, although a communication can be executed by a plurality of communication protocols, after a communication protocol to be used is selected, the communication is executed by the selected communication protocol. Accordingly, after the communication protocol is selected, the communication cannot be executed by the other communication protocols.

In contrast, a communication protocol, which executes a communication by specifying, for example, an IC card as a communication opponent, is employed in, for example, the IC card system. Further, a communication protocol, which can transmit data at a speed higher than that of the current IC card system, is employed in, for example, BT communication. Accordingly, if a communication protocol can be switched to a communication protocol for executing BT communication in, for example, the IC card system after an IC card as a communication opponent is specified, data can be transmitted at high speed. More specifically, in this case, the advantages of a plurality of communication protocols can be obtained in that a communication opponent can be specified by the communication protocol employed in the IC card system, and further data can be transmitted at high speed by the communication protocol for executing BT communication.

SUMMARY

The present system, method, apparatus, and program are made in view of the above circumstances and can execute a communication capable of acquiring the advantages of a plurality of communication protocols.

A communication system according to an embodiment has a plurality of communication apparatuses is characterized in that each of the plurality of communication apparatuses comprises a first communication mean for executing a communication between each communication apparatus and other communication apparatus by a first communication protocol, an exchange means for exchanging communication information necessary to a communication executed by a second communication protocol included in the communication protocols available by the other communication apparatus between the communication apparatus and the other communication apparatus by the communication executed by the first communication protocol, a switching means for switching the communication between each communication apparatus and the other communication apparatus from the communication executed by the first communication protocol to the communication executed by the second communication protocol, and a second communication mean for executing the communication by the second communication protocol between each communication apparatus and the other communication mean based on the communication information exchanged by the exchange means.

A communication apparatus according to an embodiment is characterized by comprising a first communication mean for executing a communication between the communication apparatus and the other communication apparatus by a first communication protocol, an acquisition means for acquiring the information of a communication protocol available by the other communication apparatus through the communication executed by the first communication protocol, an exchange means for exchanging communication information necessary to a communication executed using a second communication protocol included in the communication protocol available by the other communication apparatus between each communication apparatus and the other communication apparatus by the communication executed using the first communication protocol, a switching means for switching the communication between the communication apparatus and the other communication apparatus from the communication executed by the first communication protocol to the communication executed using the second communication protocol, and a second communication mean for executing the communication by the second communication protocol between the communication apparatus and the other communication apparatus based on the communication information exchanged by the exchange means.

A communication method according to an embodiment is characterized by comprising a first communication step of executing a communication between a communication apparatus and other communication apparatus by a first communication protocol, an acquisition step of acquiring the information of a communication protocol available by the other communication apparatus by the communication executed by the first communication protocol, an exchange step of exchanging communication information necessary to a communication executed by a second communication protocol included in the communication protocols available by the other communication apparatus between the communication apparatus and the other communication apparatus by the communication executed by the first communication protocol, a switching step of switching the communication between the communication apparatus and the other communication apparatus from the communication executed by the first communication protocol to the communication executed by the second communication protocol, and a second communication step of executing the communication by the second communication protocol between the communication apparatus and the other communication apparatus based on the communication information exchanged at the exchange step.

A program according to an embodiment is characterized by comprising a first communication step of executing a communication between a communication apparatus and other communication apparatus by a first communication protocol, an acquisition step of acquiring the information of a communication protocol available by the other communication apparatus by the communication executed by the first communication protocol, an exchange step of exchanging communication information necessary to a communication executed by a second communication protocol included in the communication protocols available by the other communication apparatus between the communication apparatus and the other communication apparatus by the communication executed by the first communication protocol, a switching step of switching the communication between the communication apparatus and the other communication apparatus from the communication executed by the first communication protocol to the communication executed by the second communication protocol, and a second communication step of executing the communication by the second communication protocol between the communication apparatus and the other communication apparatus based on the communication information exchanged at the exchange step.

In an embodiment, the communication is executed between the communication apparatus and the other communication apparatus by the first communication protocol, thereby the information of the communication protocol available by the other communication apparatus is acquired by the communication executed by the first communication protocol. Further, the communication information necessary to the communication executed by the second communication protocol included in the communication protocols available by the other communication apparatus is exchanged between the communication apparatus and the other communication apparatus by the communication executed by the first communication protocol. Then, the communication between the communication apparatus and the other communication apparatus is switched from the communication executed by the first communication protocol to the communication executed by the second communication protocol, thereby the communication by the second communication protocol is executed based on the communication information.

Additional features and advantages are described herein, and will be apparent from the following Detailed Description and the figures.

BRIEF DESCRIPTION OF THE FIGURES

FIG. 6 is a view showing a format of NFCIP-DL PDU.

FIG. 7 is a view showing a format of an NFCIP-DL header.

FIG. 9 is a view showing a format of Data of AVAILABLE_MEDIA Response.

FIG. 10 is a view showing a format of Data of MEDIA_HANDOVER Request.

FIG. 11 is a view showing a format of Data of MEDIA_HANDOVER Response.

DETAILED DESCRIPTION

Embodiments will be described below in detail with reference to the drawings.

Figure 1:
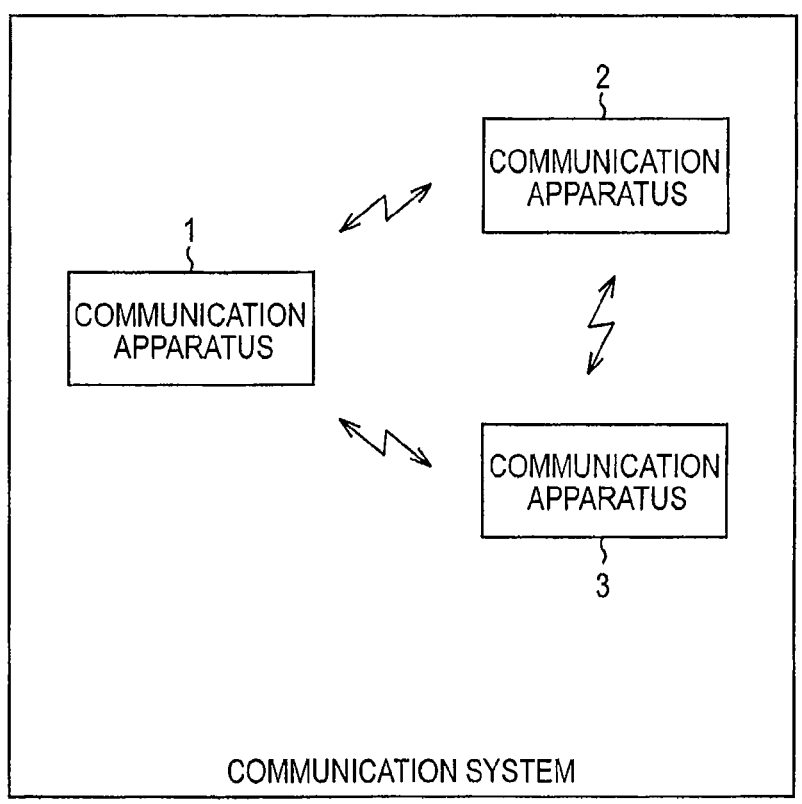
FIG. 1 is a view showing an example of an arrangement of an embodiment of a communication system.

FIG. 1 shows an example of an arrangement of a communication system to which the present embodiment is applied (system is composed of a plurality of apparatuses coupled with each other logically, and it does not matter whether or not the apparatuses having respective arrangements are accommodated in the same cabinet).

In FIG. 1, the communication system is composed of three communication apparatuses 1, 2, and 3. Each of the communication apparatuses 1, 2, and 3 can execute a communication by a plurality of protocols.

Note that communication apparatuses constituting the communication system are not limited to the communication apparatuses 1, 2, and 3, and the communication system may be composed of two or four or more communication apparatuses.

It is needless to say that the communication system shown in FIG. 1 can be employed as an IC card system in which at least one of the communication apparatuses 1, 2, and 3 is arranged as a reader/writer and at least one of the other communication apparatuses 1, 2, and 3 is arranged as an IC card. Further, the communication system may employ the respective communication apparatuses 1, 2, and 3 as mobile terminals having a communication function such as a personal digital assistant (PDA), personal computer (PC), mobile phone, wrist watch, pen, and the like. That is, the communication apparatuses 1, 2, and 3 are not limited to the IC card, the reader/writer, and the like of the IC card system. Further, the communication system can be arranged so as to include, for example, an IC card and a reader/writer constituting a conventional IC card system, in addition to the communication apparatuses 1, 2, and 3.

In this case, however, each of the communication apparatuses 1, 2, and 3 has a function for executing a wireless communication, and a plurality of communication protocols include Near Field Communication (NFC).

NFC is a communication protocol for a near field communication executed by electromagnetic induction using a single frequency carrier wave, and, for example, 13.56 MHz and the like of an Industrial Scientific Medical (ISM) is employed as the frequency of the carrier wave.

The near field communication means a communication which is possible even if a distance between apparatuses communicating with each other is within several tens of centimeters and includes a communication executed by apparatuses whose cabinets are in contact with each other.

In NFC, a communication can be executed by two communication modes. The two communication modes include a passive mode and an active mode. When an attention is paid to, for example, a communication between the communication apparatuses 1 and 2 of the communication apparatuses 1, 2, and 3, in the passive mode, one of the communication apparatuses 1 and 2, for example, the communication apparatus 1 transmits data to the communication apparatus 2 as the other communication apparatus by modulating (a carrier wave corresponding to) the electromagnetic wave generated by the communication apparatus 1 likewise the IC card system described above. The communication apparatus 2 transmits data to the communication apparatus 1 by load modulating (the carrier wave corresponding to) the electromagnetic wave generated by the communication apparatus 1.

In contrast, in the active mode, any of the communication apparatuses 1 and 2 transmits data by modulating (a carrier wave corresponding to) the electromagnetic wave generated by it.

When the near filed communication is executed by electromagnetic induction, an apparatus, which begins a communication by outputting an electromagnetic wave first, that is, which takes the initiative of the communication, is called an initiator. The initiator executes the near field communication by transmitting a command (request) to a communication opponent, and the communication opponent returns a response to the command, and the communication opponent which returns the response to the command from the initiator is called a target.

Figure 2:
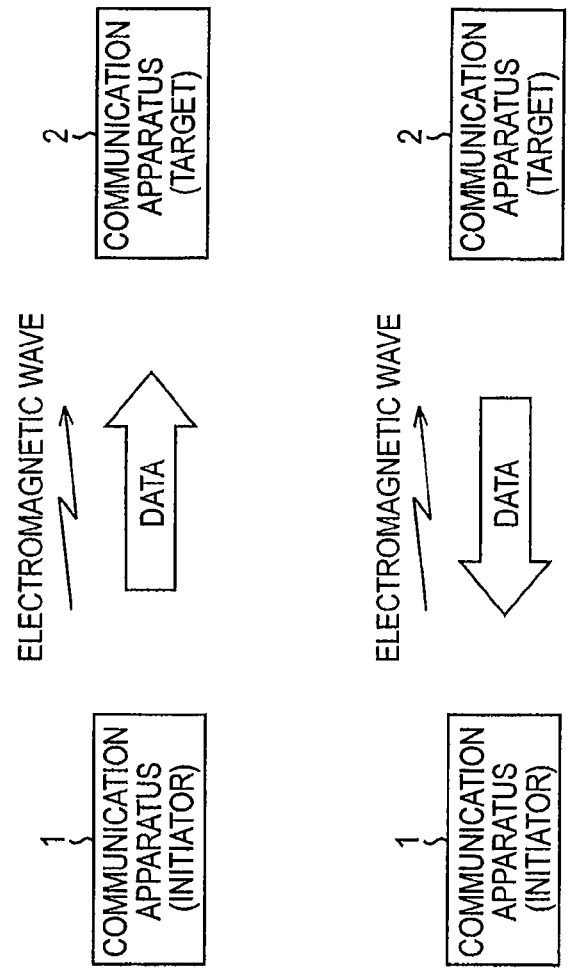
FIG. 2 is a view explaining a passive mode.
Figure 3:
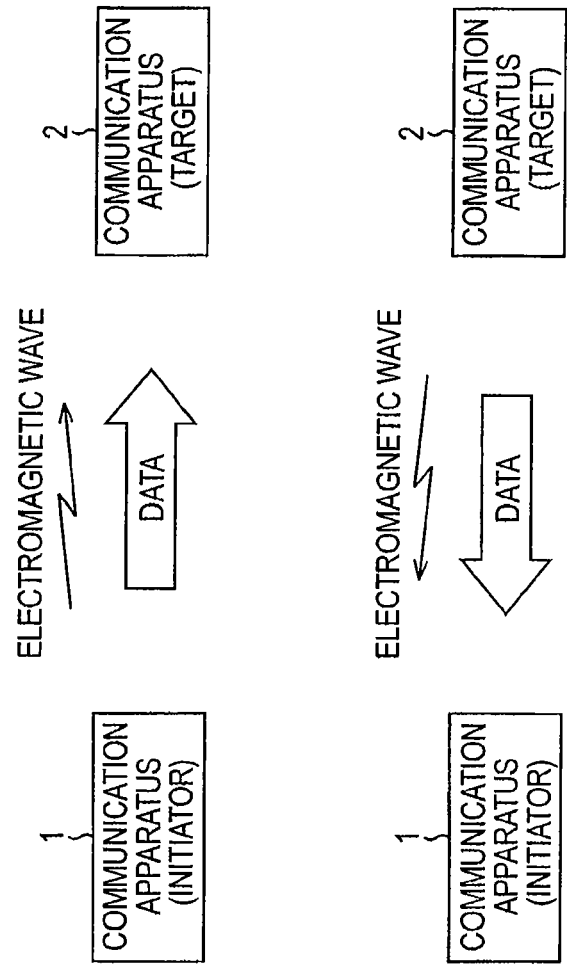
FIG. 3 is a view explaining an active mode.

When it is supposed, for example, that the communication apparatus 1 begins to output an electromagnetic wave and to communicate with the communication apparatus 2, the communication apparatus 2 acts as the target and the communication apparatus 2 acts as the target as shown in FIGS. 2 and 3.

As shown in FIG. 2, in the passive mode, the communication apparatus 1 as the initiator transmits data to the communication apparatus 2 as the target by continuously outputting an electromagnetic wave and modulating the electromagnetic wave output thereby. Then, the communication apparatus 2 transmits data to the communication apparatus 1 by load modulating the electromagnetic wave output by the communication apparatus 1 as the initiator.

In contrast, as shown in FIG. 3, when the communication apparatus 1 as the initiator transmits data, it transmits the data to the communication apparatus 2 as the target by beginning to output an electromagnetic wave by itself and modulating it. After the transmission of the data is finished, the communication apparatus 1 stops outputting the electromagnetic wave. When the communication apparatus 2 as the target transmits data, it also transmits the data to the communication apparatus 2 as the target by beginning to output an electromagnetic wave by itself and modulating it. After the transmission of the data is finished, the communication apparatus 2 stops outputting the electromagnetic wave.

Figure 4:
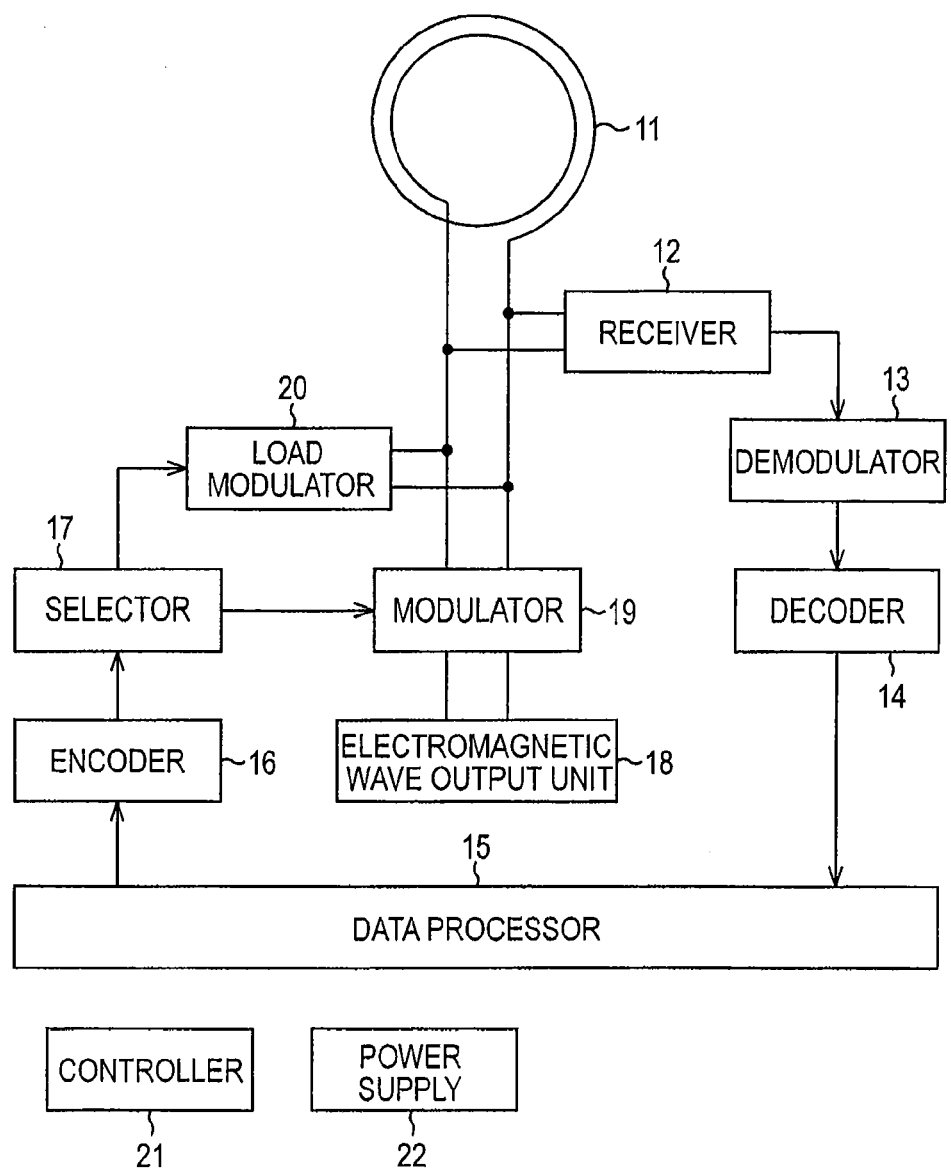
FIG. 4 is a block diagram showing an example of an arrangement of a portion of communication apparatuses 1 to 3 for executing a NFC communication.

Next, FIG. 4 shows an example of an arrangement of a portion, which executes an NFC communication, of the communication apparatus 1 in FIG. 1. Note that since portions, which execute the NFC communication, of the other communication apparatuses 2 and 3 of FIG. 1 are arranged similarly to the communication apparatus 1 of FIG. 4, the explanation of them is omitted.

An antenna 11 constitutes a closed loop coil and outputs an electromagnetic wave by changing a current flowing in the coil. Further, a current flows in the antenna 11 in such a manner that magnetic flux passing through the coil as the antenna 11 changes.

A receiver 12 receives the current flowing in the antenna 11, tunes and detects the current, and outputs it to a demodulator 13. The demodulator 13 demodulates a signal supplied from the receiver 12 and supplies it to a decoder 14. The decoder 14 decodes, for example, Manchester Code as the signal supplied from the demodulator 13 and supplies data obtained as a result of decode to a data processor 15.

The data processor 15 executes predetermined processing based on the data supplied from the decoder 14. Further, the data processor 15 supplies data, which is to be transmitted to other apparatus, to an encoder 16.

The encoder 16 encodes the data supplied from the data processor 15 to, for example, Manchester Code and the like and supplies it to a selector 17. The selector 17 selects any one of a modulator 19 and a load modulator 20 and outputs the signal supplied from the encoder 16 to the selected modulator.

The selector 17 selects the modulator 19 or the load modulator 20 under the control of a controller 21. When a communication mode is the passive mode and the communication apparatus 1 acts as the target, the controller 21 makes the selector 17 to select the load modulator 20. Further, when the communication method is the active mode or when the construction mode is the passive mode as well as the communication apparatus 1 acts as the initiator, the controller 21 makes the selector 17 to select the modulator 19. Accordingly, in a case in which the communication method is the passive mode and the communication apparatus 1 acts as the target, the signal output from the encoder 16 is supplied to the load modulator 20 through the selector 17. In the other cases, however, the signal is supplied to the modulator 19 through the selector 17.

An electromagnetic wave output unit 18 flows a current to the antenna 11 to cause the antenna 11 to radiate (the electromagnetic wave) of a carrier wave having a predetermined single frequency. The modulator 19 modulates the carrier wave as the current, which is flown in the antenna 11 by the electromagnetic wave output unit 18, according to the signal supplied from the selector 17. With this operation, the antenna 11 radiates an electromagnetic wave obtained by modulating the carrier wave according to the data output from the data processor 15 to the encoder 16.

The load modulator 20 changes impedance when the coil as the antenna 11 is observed from the outside according to the signal supplied from the selector 17. When an RF field (magnetic field) is formed in the vicinity of the antenna 11 by an electromagnetic wave output by other apparatus as a carrier wave, the RF field in the vicinity of the antenna 11 also changes as the impedance when the coil as the antenna 11 is observed changes. With this arrangement, the carrier wave as the electromagnetic wave output from the other apparatus is modulated according to the signal supplied from the selector 17, thereby the data output from the data processor 15 to the encoder 16 is transmitted to the other apparatus that outputs the electromagnetic wave.

Here, amplitude modulation (ASK (Amplitude Shift Keying)), for example, can be employed as a modulation system in the modulator 19 and the load modulator 20. However, the modulation system in the modulator 19 and the load modulator 20 is not limited to ASK, and Phase Shift Keying (PSK), Quadrature Amplitude Modulation (QAM), and the like can be also employed. Further, a degree of modulation of amplitude is not limited to the values from 8% to 30%, 50%, 100% and the like, and an appropriate value may be selected.

The controller 21 controls the respective blocks constituting the communication apparatus 1. A power supply 22 supplies necessary power to the respective blocks constituting the communication apparatus 1. Note that, in FIG. 4, lines showing that the controller 21 controls the respective blocks constituting the communication apparatus 1 and lines showing that the power supply 22 supplies power to the respective blocks constituting the communication apparatus 1 are omitted to prevent the figure from being made complex.

In the case described above, the decoder 14 and the encoder 16 processes Manchester Code. However, it is possible for the decoder 14 and the encoder 16 to select and process one of a plurality of types of codes such as a modified mirror code, NRZ, and the like, in addition to Manchester Code.

Further, when the communication apparatus 1 operates only as the target of the passive mode, the communication apparatus 1 can be arranged without providing the selector 17, electromagnetic wave output unit 18, and the modulator 19. Further, in this case, the power supply 22 obtains power from, for example, an external electromagnetic wave received by the antenna 11.

As described above, the communication apparatuses 1, 2, and 3 are arranged such that they can execute communications by a plurality of communication protocols, and a communication executed by the arrangement of FIG. 4 using NFC is one of the communications executed by the plurality of communication protocols. As the plurality of communication protocols, there can be employed, for example, International Organization for Standardization/International Electrotechnical Commission (ISO/IEC) 14443 that regulates a communication by an IC card, ISO/IEC 15693 that regulates a communication of Radio Frequency Tag (RF tag), Bluetooth, and further WLAN, and other communication protocols, in addition to the NFC.

Figure 5:
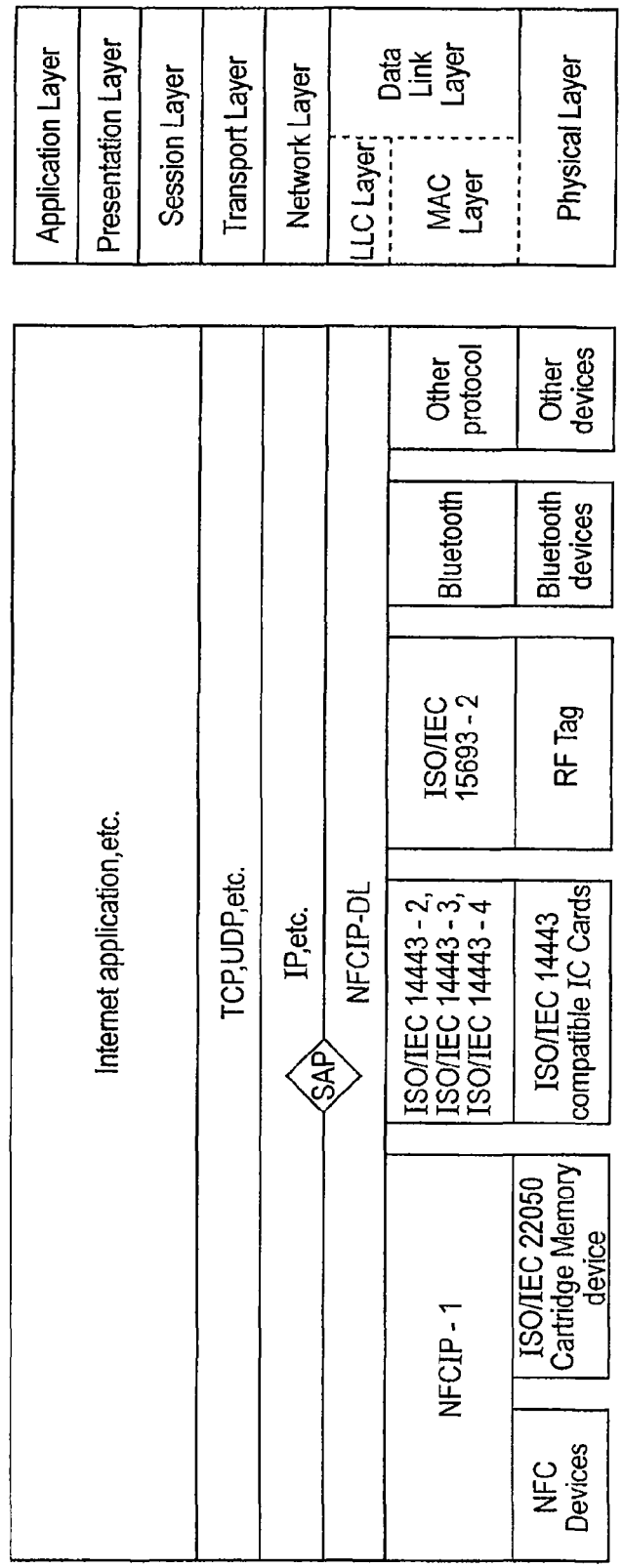
FIG. 5 is a view showing a corresponding relation between the communication protocols of the communication apparatuses 1 to 3 and an OSI hierarchy model.

FIG. 5 shows a corresponding relation between the communication protocols of the communication apparatuses 1 to 3 and an OSI hierarchy model.

In the communication apparatuses 1, 2, and 3, for example, Internet Applications (for example, Hyper Text Transfer Protocol (HTTP), File Transfer Protocol (FTP), and the like), and other arbitrary applications can be employed to seventh Application Layer as an uppermost layer, sixth Presentation Layer, and a fifth Session Layer.

Transmission Control Protocol (TCP), User Datagram Protocol (UDP), and the like, for example, can be employed to fourth Transport Layer.

Internet Protocol (IP) and the like, for example, can be employed to third Network Layer.

Second Data Link Layer can be divided into upper Logical Link Control Layer (LLC layer) and lower Media Access Control Layer (MAC layer).

In the communication apparatuses 1, 2, and 3, Near Field Communication Interface and Protocol Data Link (NFCIP-DL) is employed to the LLC layer. Here, NFCIP-DL is a communication protocol of a part of NFC and can be controlled from the upper layer thereof through Service Access Point (SAP). In NFCIP-DL, the information of a communication protocol that can be used by a communication opponent (hereinafter, appropriately called available protocol information) is obtained through NFCIP-1 to be described later. Further, NFCIP-DL exchanges information (hereinafter, appropriately called communication information), which is necessary to execute a communication by a communication protocol of MAC layer (and further a physical layer) switched from NFCIP-1 therethrough in response to a request from the upper layer, between it and a communication apparatus that executes a communication by NFCIP-1. Then, NFCIP-DL switches (handovers) the communication protocol from NFCIP-1 to a communication protocol corresponding to the exchanged communication information in response to the request from the upper layer. Note that the communication protocol switched from NFCIP-1 is selected from available communication protocols represented by the available protocol information.

As described above, when NFCIP-DL is mounted on the communication apparatuses 1, 2, and 3, the apparatuses can switch (handover) the communication protocol of MAC layer (and further the physical layer).

NFCIP-1, ISO/IEC 14443-2, ISO/IEC 14443-3, and ISO/IEC 14443-4 employed to the IC card, ISO/IEC 15693-2 employed to the RF tag, Bluetooth, and further WLAN and other protocols, for example, can be employed to MAC layer. Note that it is assumed in the embodiment that a plurality of communication protocols including NFCIP-1 are employed to the MAC layer in, for example, the communication apparatuses 1, 2, and 3.

Here, NFCIP-1 is a communication protocol of a part of NFC and detects whether or not an RF field exists in the vicinity, and when no RF field is detected, NFCIP-1 outputs an electromagnetic wave (forms the RF field by itself). Further, when a communication opponent exists in the RF field, that is, when NFCIP-1 is brought into vicinity of the communication opponent, NFCIP-1 obtains Identification (ID) composed of random numbers from the communication opponent and communicates with the communication opponent by specifying it by ID. That is, according to NFCIP-1, when a plurality of apparatuses exist in the vicinity of it, a user can specify an apparatus acting as a communication protocol from the plurality of apparatuses and communicates with the apparatus without executing an operation for selecting the apparatus acting as the communication opponent from the plurality of the apparatus.

Specifically, in, for example, WLAN composed of a plurality of computers, when one computer transmits and receives data to and from the other one computer, the other one computer must be specified by a user in such as manner that the user selects the icon representing the other one computer, to and from which the data is transmitted and received, from a plurality of icons displayed on a screen to represent the plurality of computers constituting WLAN. In this case, when WLAN is composed of many computers, it is burdensome for the user to search the icon representing the other one computer.

In contrast, in NFCIP-1, when it is located in the vicinity of a communication opponent, it obtains ID, which is composed of random numbers, of the communication opponent and communicates with the communication opponent by specifying it by ID. Therefore, according to NFCIP-1, since the user can execute a communication by specifying a communication opponent only by, for example, causing the communication apparatus 1 (2 or 3) to approach over an apparatus which he or she desires to select as a communication opponent, the user need not execute the burdensome job as described above.

A device and the like, which are necessary to a communication executed by a communication protocol employed in MAC layer by the communication apparatuses 1 to 3, are employed to the first physical layer. That is, in NFCIP-1, ISO/IEC 22050, for example, which regulates devices dedicated for a communication by NFC (NFC Devices) and Cartridge Memory Device, can be employed to the physical layer. In ISO/IEC 14443-2, ISO/IEC 14443-3, and ISO/IEC 14443-4, for example, ISO/IEC 14443, which regulates compatible IC Cards, can be employed to the physical layer. In ISO/IEC 15693-2, a device dedicated to a communication by the RF tag can be employed to the physical layer. Further, in Bluetooth, devices dedicated to a communication by Bluetooth (Bluetooth devices) can be employed to the physical layer. Further, in the communication protocol of MAC layer of WLAN and the like, other devices dedicated to a communication by the communication protocol can be employed to the physical layer.

Next, FIG. 6 shows a format of data transmitted and received to and from NFCIP-DL as a part of the NFC.

In NFCIP-DL, the data is transmitted and received in a unit called Protocol data Unit (NFCIP-DL PDU).

NFCIP-DL PDU has the same format as a packet transmitted and received in Point to Point Protocol (PPP), thereby affinity can be improved between NFCIP-DL and PPP.

NFCIP-DL PDU has Start Mark, Address, Control, Protocol, NFCIP-DL header, Data, CRC, and End Mark sequentially disposed from the leading end thereof.

Start Mark has, for example, 1 byte of 7Eh (h shows that a value in front of it is a hexadecimal numeral) disposed therein as a start mark showing the start of NFCIP DL PDU. Address has, for example, 1 byte of FFh disposed therein as predetermined data. Control also has, for example, 1 byte of 03h disposed therein as predetermined data.

In NFCIP-DL, the data disposed in Start Mark, Address, and Control is the same as that in PPP.

Protocol has, for example, 2 bytes of 0001h disposed therein. When 0001h is disposed in Protocol in PPP, it is assumed that the data disposed in Data has no particular meaning. However, when 0001h is disposed in Protocol in NFCIP-DL, the packet (PDU) is handled as NFCIP-DL PDU.

NFCIP-DL header has 6-bytes of header information disposed therein which will be explained below with reference to FIG. 7. Data has necessary data disposed therein. CRC has Cyclic Redundancy Checking (CRC) code disposed therein which is determined for Address, Control, Protocol, NFCIP-DL header, and Data.

End Mark has, for example, 1 byte of 7Eh as an end mark showing the end of NFCIP-DL PDU. The end mark is the same as that in PPP.

FIG. 7 shows a format of the header information disposed in NFCIP-DL header.

The header information is composed of 6 bytes as described above. Codes 4Eh, 46h, and 43h, which show the characters N, F, C of NFC, are disposed in Byte 1, Byte 2, and Byte 3 from the leading end of the header information. A value showing the version of NFC is disposed in Byte 4. Note that, in FIG. 7, the value showing the version of NFC is 21h.

Byte 5 is Reserved for Future Use (RFU) and has 00h disposed therein in FIG. 7.

Byte 6 has Directive Code disposed therein which shows various types of requests and responses to them. That is, as explained in FIG. 4, in NFC, a communication is executed between the initiator and the target in such a manner that the initiator transmits a request and the target returns a response to the request. Directive Code as a code showing the request and the response is disposed in the sixth byte.

As described above, in NFCIP-DL, available protocol information as the information of a communication protocol that can be used by a communication opponent is obtained, and communication information, which is necessary to execute a communication by a certain communication protocol included in the available communication protocols represented by the available protocol information, is exchanged. Then, NFCIP-DL switches (handovers) the communication protocol from NFCIP-1 to a communication protocol corresponding to the exchanged communication information.

AVAILABLE_MEDIA Request is transmitted from the initiator to the target to request the available protocol information. AVAILABLE_MEDIA Request is transmitted from the initiator to the target to request the available protocol information. AVAILABLE_MEDIA Response is transmitted from the target to the initiator as a response to AVAILABLE_MEDIA Request.

Further, MEDIA_HANDOVER Request is transmitted from the initiator to the target to request to switch (handover) a communication protocol. MEDIA_HANDOVER Response is transmitted from the target to the initiator as a response to MEDIA_HANDOVER Request.

In AVAILABLE_MEDIA Response, a directive code is set to, for example, 22h. Further, when the information of all the communication protocols that can be used by the communication opponent (here, target) is requested, 01h is disposed to Data.

Further, when usability of a particular communication protocol is requested to the communication opponent in AVAILABLE_MEDIA Response, information showing the particular communication protocol is disposed to Data.

Figure 8:
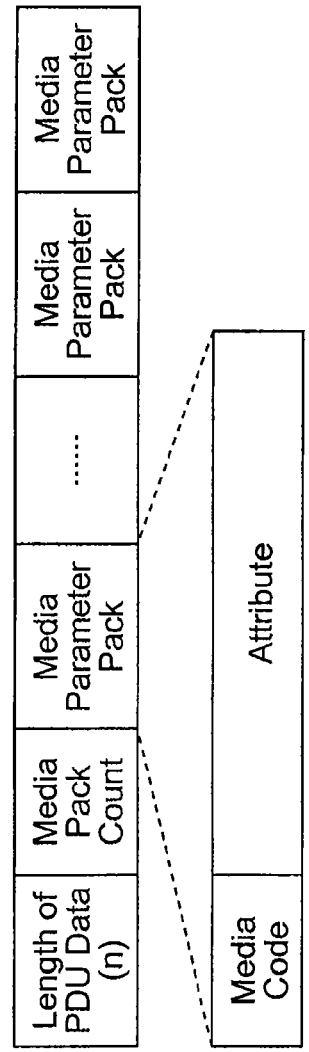
FIG. 8 is a view showing a format of Data of AVAILABLE_MEDIA Request.

More specifically, FIG. 8 shows a format of Data of NFCIP-DL PDU when the usability of the particular communication protocol is requested to the communication opponent in AVAILABLE_MEDIA Request.

Length of PDU Data (n), which shows the data length of Data, is disposed to the leading end of Data. Media Pack Count, which shows the number of Media Parameter Packs to be described later, is disposed behind the data length. Then, Media Parameter Packs as many as the number shown by Media Pack Count are disposed behind Media Pack Count.

Media Parameter Pack is composed of Media Code and Attribute disposed in this order. One byte of media code showing the communication protocol is disposed to Media Code, and information as to the communication protocol represented by a media code disposed to Media Code is disposed to Attribute.

In AVAILABLE_MEDIA Response, when, for example, availability of two communication protocols, that is, Institute of Electrical and Electronics Engineers (IEEE) 802.11 that regulates WLAN and Bluetooth are requested to the communication opponent, two Media Parameter Packs, that is, Media Parameter Pack, in which a media code representing IEEE 802.11 is disposed, and Media Parameter Pack, in which a media code representing Bluetooth is disposed, are disposed behind Media Pack Count.

In AVAILABLE_MEDIA Response as the response to AVAILABLE_MEDIA Request, the directive code is set to, for example, 23h. Further, in AVAILABLE_MEDIA Response, information showing a communication protocol that can be used by an apparatus (here, the target as an apparatus that receives AVAILABLE_MEDIA Request) is disposed in Data.

More specifically, FIG. 9 shows a format of Data of NFCIP-DL PDU as AVAILABLE_MEDIA Response.

Length of PDU Data (n) is disposed to the leading end of Data likewise the case shown in FIG. 8. Further, Current Phase, Status, and Error Code are sequentially disposed behind Length of PDU Data (n). Here, Current Phase shows that NFCIP-DL PDU belongs to any of the phases of NFCIP-DL described later. Status shows the present state (status) of NFCIP-DL PDU, and Error Code shows a code corresponding to an error that occurs in any processing.

Media Pack Count is disposed behind Error Code. Media Pack Count shows the number of Media Parameter Packs disposed behind it.

Media Parameter Packs as many as the number shown by Media Pack Count are disposed behind Media Pack Count to show each communication protocol that can be used by NFCIP-DL PDU. Note that since the arrangement of Media Parameter Pack in FIG. 9 is the same as that described in FIG. 8, the explanation thereof is omitted.

The initiator, which has transmitted AVAILABLE_MEDIA Request, receives AVAILABLE_MEDIA Response transmitted by the target in response to AVAILABLE_MEDIA Request and recognizes a communication protocol that can be used by the target referring to Media Parameter Pack in AVAILABLE_MEDIA Response.

Note that when 01h is set to Data of AVAILABLE_MEDIA Request from the initiator, the target transmits AVAILABLE_MEDIA Response, which has Media Parameter Pack as to all the communication protocols that can be used by it, to the initiator. Further, Data of AVAILABLE_MEDIA Request from the initiator is as shown in FIG. 8, the target transmits AVAILABLE_MEDIA Response, which has information whether or not it can use the respective communication protocols corresponding to Media Parameter Pack of AVAILABLE_MEDIA request, to the initiator.

In MEDIA_HANDOVER Request, the directive code is set to, for example, 24h. Further, information of a communication protocol handovered from NFCIP-1 is disposed to Data.

More specifically, FIG. 10 shows a format of Data of NFCIP-DL PDU as MEDIA_HANDOVER Request.

Length of PDU Data (11n), which shows the data length of Data, is disposed to the leading end of Data. Media Parameter Pack as to a communication protocol handovered from NFCIP-1 is disposed behind the data length. Note that since the arrangement of the Media Parameter Pack in FIG. 10 is the same as that described in FIG. 8, the explanation thereof is omitted.

In MEDIA_HANDOVER Response as the response to MEDIA_HANDOVER Request, the directive code is set to, for example, 25h. Further, predetermined data is disposed to DATA in MEDIA_HANDOVER Response.

More specifically, FIG. 11 shows a format of Data of NFCIP-DL PDU as MEDIA_HANDOVER Response.

Length of PDU Data (04h), Current Phase, Status, and Error Code are sequentially disposed to Data from the leading end thereof. Since Length of PDU Data, Current Phase, Status, and Error Code are the same as those explained in FIG. 9, the explanation thereof is omitted.

AVAILABLE_MEDIA Request and AVAILABLE_MEDIA Response are transmitted between the initiator and the target by NFCIP-1, thereby the initiator recognizes a communication protocol that can be used by the target. Further, MEDIA_HANDOVER Request and MEDIA_HANDOVER Response are transmitted between the initiator and the target by NFCIP-1, thereby the initiator and the target handovers from a communication by NFCIP-1 to a communication by a certain communication protocol recognized by the initiator. Thereafter, the initiator and the target execute a communication by the communication protocol after the handover.

Figure 12:
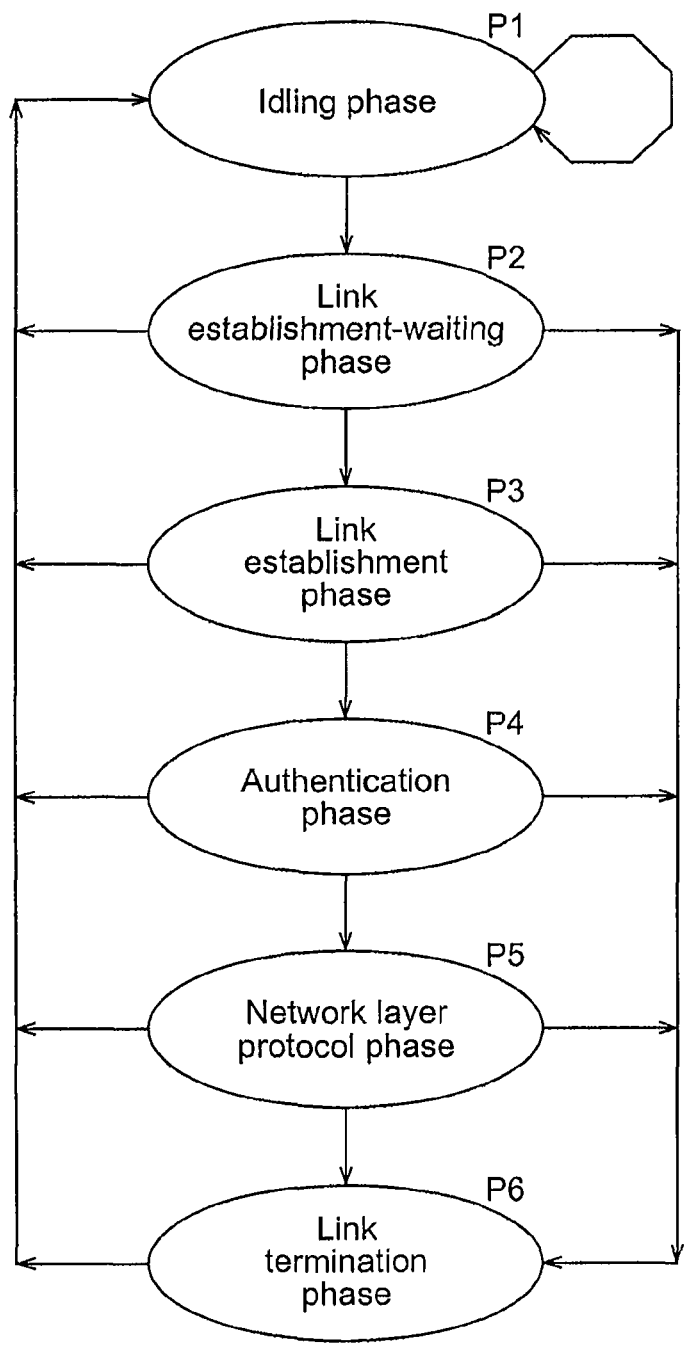
FIG. 12 is a view showing a communication phase by NFCIP-DL.

Next, a communication phase by NFCIP-DL will be explained with reference to FIG. 12.

A communication by NFCIP-DL has six phases, that is, Idling phase P1, Link establishment-waiting phase P2, Link establishment phase P3, Authentication phase P4, Network layer protocol phase P5, and Link termination phase P6.

In the communication by NFCIP-DL, first, a process goes to Idling phase P1 as an initial phase. In Idling phase P1, detection of the RF field described above and the like are executed.

In Idling phase P1, when it is requested, for example, to detect an apparatus that can make an NFC communication, the process goes to Link establishment-waiting phase P2, in which the apparatus that can make the NFC communication begins to be searched. Note that the process may go to Idling phase P1, Link establishment phase P3, or Link termination phase P6 from Link establishment-waiting phase P2.

When, for example, the apparatus that can make the NFC communication is detected in Link establishment-waiting phase P2, the process goes to Link establishment phase P3. In Link establishment phase P3, ID composed of a random number (hereinafter, appropriately referred to as NFC ID) is recognized in Link establishment phase P3 to recognize an apparatus as a communication opponent of the NFC communication, and a link is established to the communication opponent whose NFC ID is recognized. Note that the process may go to Idling phase P1, Authentication phase P4, or Link termination phase P6 from Link establishment phase P3.

When the link is established to the communication protocol whose NFC ID is recognized, the process goes to Authentication phase P4. In Authentication phase P4, mutual authentication is executed between the apparatus and the communication opponent whose NFC ID recognized. Note that the process may go to Idling phase P1, Network layer protocol phase PS, or Link termination phase P6 from Authentication phase P4. Further, Link termination phase P6 may be skipped.

When, for example, the mutual authentication is succeeded between the apparatus and, for example, the communication opponent whose NFC ID is recognized in Authentication phase P4, the process goes to Network layer protocol phase P5. In Network layer protocol phase P5, necessary data is exchanged (transmitted) bet the apparatus and the communication opponent whose NFC ID is recognized. Note that the process may go to Idling phase P1 or Link termination phase P6 from Network layer protocol phase P5.

In Network layer protocol phase PS, when, for example, it is requested to terminate the NFC communication, the process goes to Link termination phase P6. In Link termination phase P6, the link to the communication opponent whose NFC ID is recognized is interrupted, and the process goes to Idling phase P1.

Next, processing between the initiator and the target will be explained with respect to FIGS. 13 and 14 when an NFCIP-1 communication is started between the initiator and the target and thereafter the communication protocol of MAC Layer (and further Physical layer) is handovered from NFCIP-1 to other communication protocol.

First, processing executed by the initiator will be explained.

First, the initiator is placed in an idle state at step S1.

Thereafter, the initiator goes from step S1 to step S2, at which the initiator forms the RF field and executes polling for requesting NFC ID, and then the initiator goes to step S3. At step S3, the initiator determines whether or not there is a response to the polling from the target. When it is determined at step S3 that there is no response to the polling at step 53, the initiator returns to step S2 and repeats the same processing thereafter.

Further, when it is determined at step S3 that there is the response to the polling, the initiator goes to step S4 at which it requests NFC ID to the target from which the response is returned and receives NFC ID transmitted from the target in response to the request. The initiator specifies the target as the communication opponent by NFC ID.

Thereafter, the initiator goes from step S4 to step S5 at which it executes mutual authentication between it and the target recognized as the communication opponent, further exchanges a transaction ID and a transaction key therebetween, and the initiator goes to step S6. Note that after the transaction ID and the transaction key are exchanged, the initiator and the target encrypt data, which is transmitted therebetween thereafter, using the transaction ID and the transaction key as a cryptographic key.

At step S6, the initiator requests the target a communication protocol that can be used by the target and receives the available protocol information of the available communication protocol transmitted from the target in response to the request. That is, at step S6, the initiator transmits AVAIL-ABLE_MEDIA Request to the target and receives AVAIL-ABLE_MEDIA Response as a response to AVAILABLE_ MEDIA Request from the target. With this operation, the initiator recognizes the available communication protocol of the target.

Thereafter, the initiator selects a desired communication protocol (hereinafter, appropriately referred to as desired protocol) from the communication protocols that can be used by the initiator and the target and goes from step S6 to 57. At step S7, the initiator exchanges communication information, which is necessary to a communication by the desired protocol, between it and the target and goes to step S8.

At step S8, the initiator switches (handovers) the communication protocol of MAC Layer (and further Physical Layer) from NFCIP-1 to the desired protocol. That is, at step S8, the initiator transmits MEDIA_HANDOVER Request to the target and receives AVAILABLE_MEDIA Response as a response to MEDIA_HANDOVER Request from the target. Then, the initiator switches the communication protocol of MAC Layer (and further Physical Layer) from NFCIP-1 to the desired protocol.

Thereafter, the initiator goes from step S8 to S9 at which it terminates the NFC communication. After the termination of the NFC communication, the initiator makes a communication by the desired protocol based on the communication information obtained at step S7 and returns to step S1 after the termination of the communication.

Next, processing executed by the target will be explained with reference to a flowchart of FIG. 14.

First, the target is placed in an idle state at step S21.

Thereafter, when, for example, the target receives polling from the initiator, it goes from step S21 to S22 at which it transmits a response to the polling to the initiator and goes to step S23. At step S23, the initiator waits for a request for an NFC ID from the initiator, creates NFC ID by a random number, transmits it to the initiator, and goes to step S24. Here, for example, the request for the NFC ID from the initiator includes the NFC ID of the initiator, and the target specifies the initiator acting as a communication opponent by the NFC ID of the initiator.

Thereafter, the target goes from step S23 to step S24 at which it executes mutual authentication between it and the initiator specified as the communication opponent by the NFC ID and further exchanges a transaction ID and a transaction key between it at the time of mutual authentication and goes to step S25. Note that, as explained in FIG. 13, after the transaction ID and the transaction key are exchanged, the target and the initiator encrypt data, which is transmitted therebetween thereafter, using the transaction ID and the transaction key as a cryptographic key.

At step S25, the target waits for transmission of a request for an available communication protocol from the initiator and transmits the available protocol information of a communication protocol, which can be used by the target, to the initiator. That is, at step S25, the target receives AVAIL-ABLE_MEDIA Request from the initiator and transmits AVAILABLE_MEDIA Response as a response to AVAIL-ABLE_MEDIA Request to the initiator as available protocol information.

Figure 13:
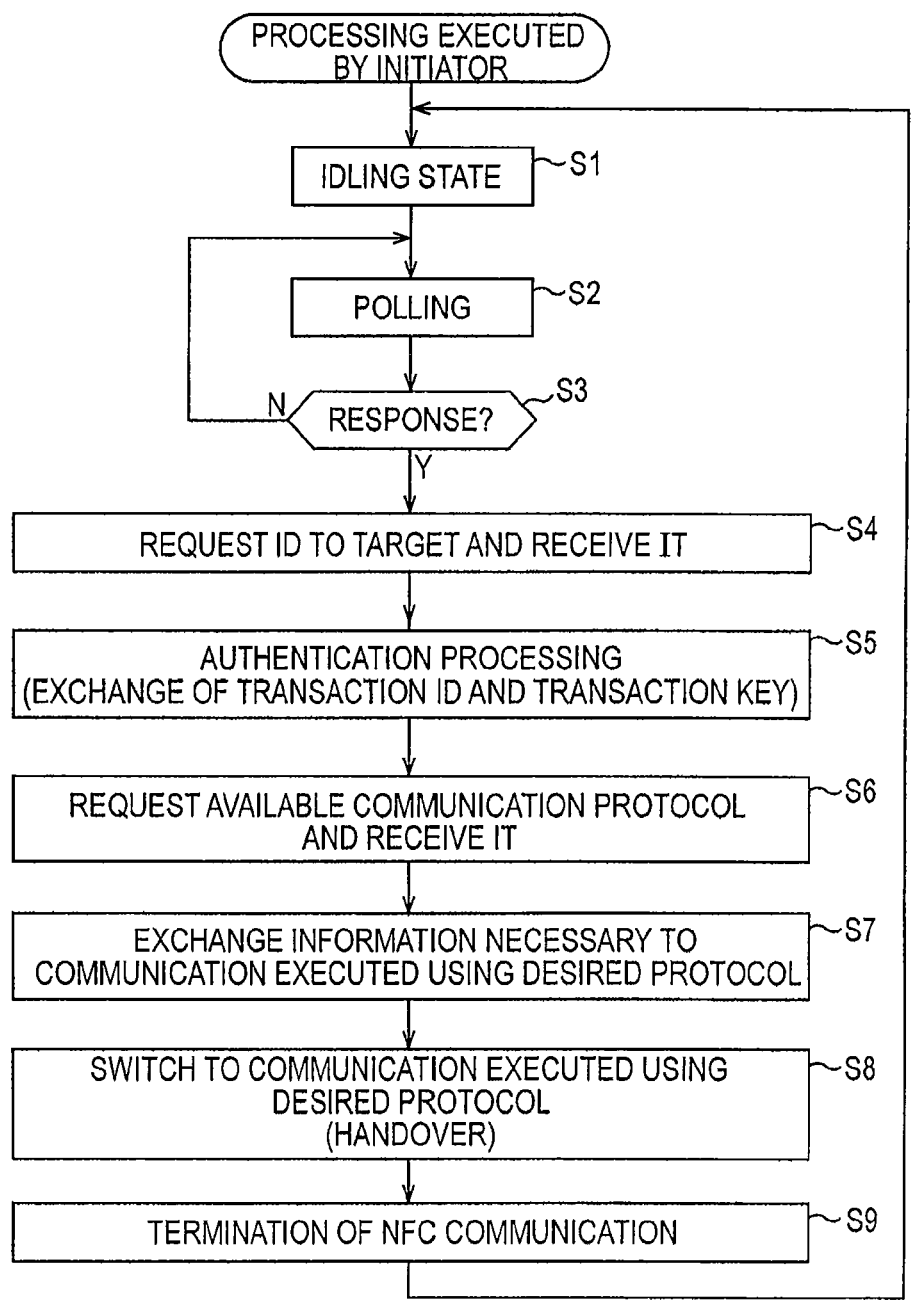
FIG. 13 is a flowchart explaining processing executed by an initiator.
Figure 14:
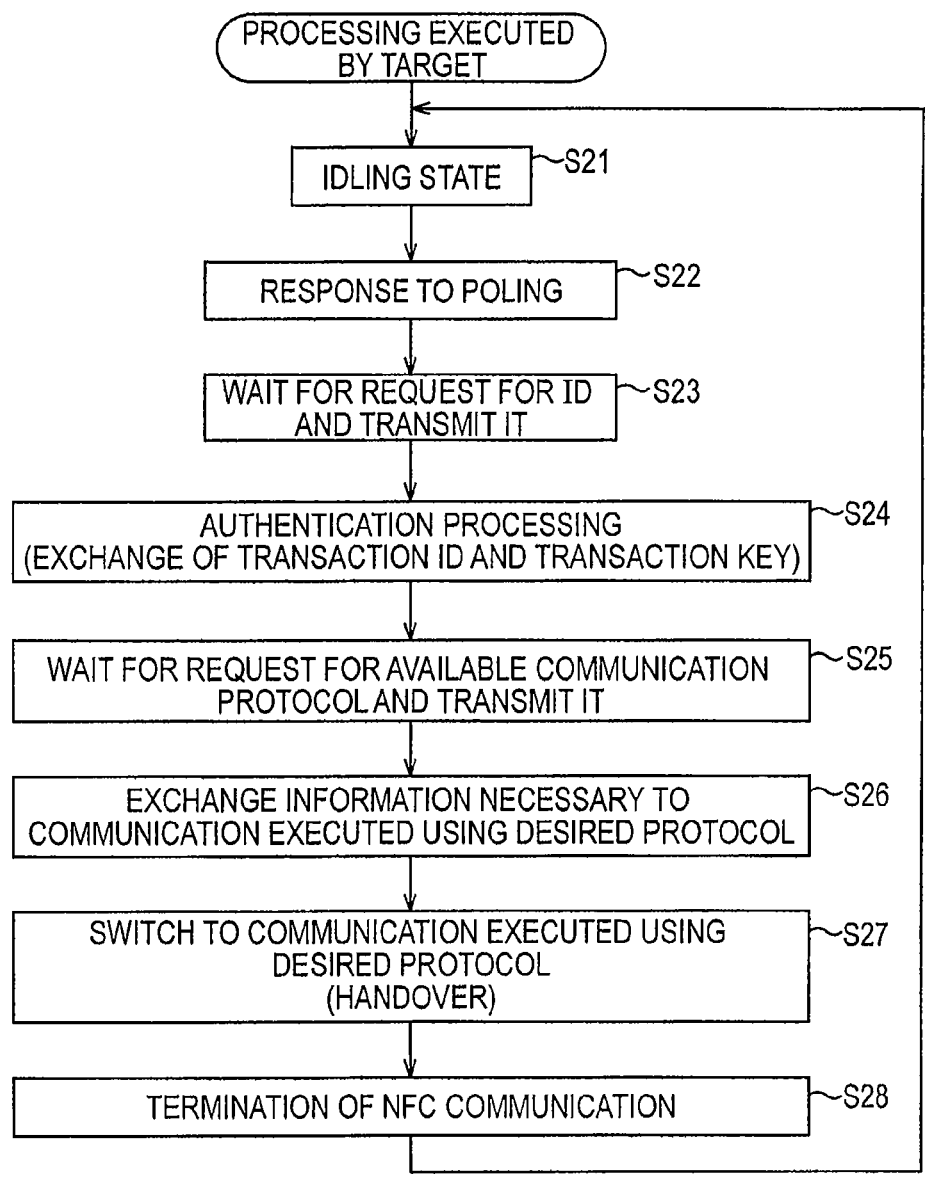
FIG. 14 is a flowchart explaining processing executed by a target.

Thereafter, the target goes from step S25 to S26 at which it exchanges communication information, which is necessary to the communication by the desired protocol explained in FIG. 13, between it and the initiator and goes to step S27.

At step S27, the target switches (handovers) the communication protocol of MAC Layer (and further Physical Layer) from NFCIP-1 to the desired protocol. That is, at step S27, the target receives MEDIA_HANDOVER Request from the initiator and transmits MEDIA_HANDOVER Response as a response to MEDIA_HANDOVER Request to the initiator. Then, the target switches the communication protocol of MAC Layer (and further Physical Layer) from NFCIP-1 to the desired protocol.

Thereafter, the target goes from step S27 to S28 at which it terminates the NFC communication. After the termination of the NFC communication, the target makes a communication by the desired protocol based on the communication information obtained at step S26 and returns to step S21 after the termination of the communication.

Next, when it is assumed, for example, that the communication apparatuses 1 and 2 can make both of a communication by NFC and a communication (BT communication) by Bluetooth, processing will be explained which is executed by the communication apparatuses 1 and 2 to execute the NFC communication first and then to handover the NFC communication to the BT communication.

Figure 15:
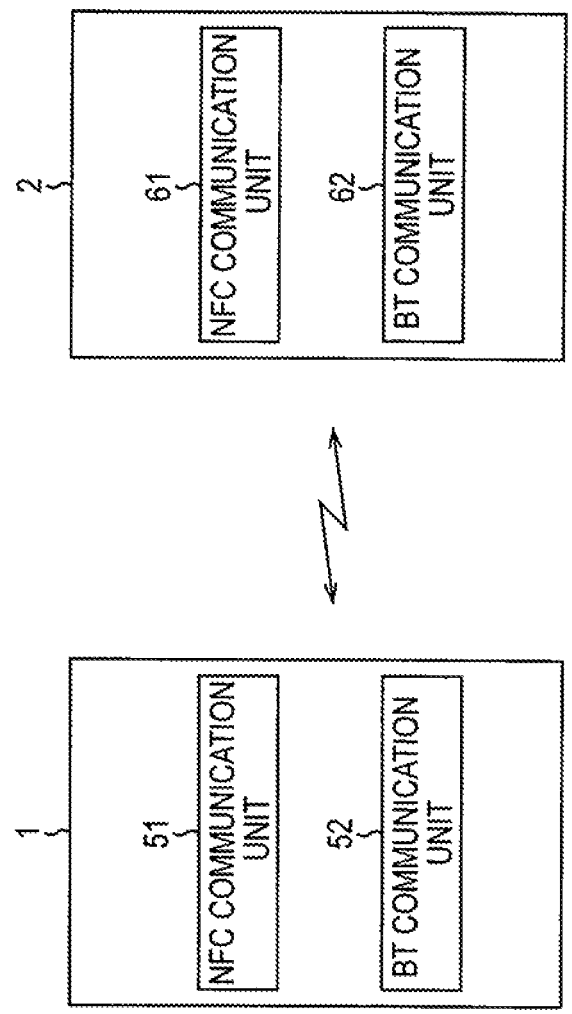
FIG. 15 is a block diagram of examples of functional arrangements of the communication apparatuses 1 and 2.

Note that FIG. 15 shows an example of functional arrangements of the communication apparatuses 1 and 2.

More specifically, in FIG. 15, the communication apparatus 1 has an NFC communication unit 51 and a BT communication unit 52, and the communication apparatus 2 has an NFC communication unit 61 and a BT communication unit 62. The NFC communication units 51 and 62 execute the NFC communication, and the BT communication units 52 and 62 execute the BT communication.

Figure 16:
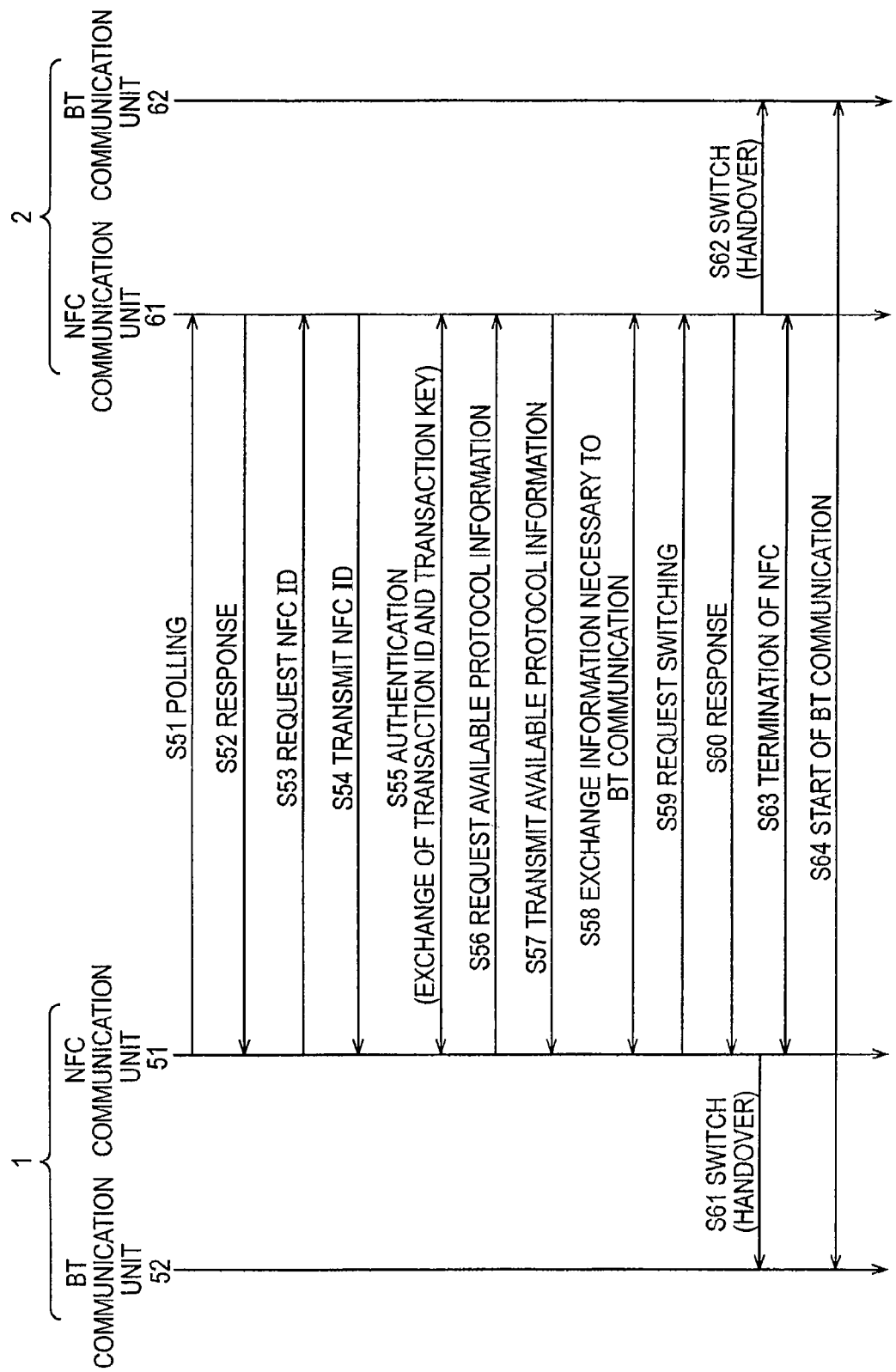
FIG. 16 is a flowchart explaining processing executed by the communication apparatuses 1 and 2.

FIG. 16 is a flowchart explaining processing executed by the communication apparatuses 1 and 2 when the NFC communication is executed first using the communication apparatuses 1 and 2 as the initiator and the target, and thereafter the NFC communication is handovered to the BT communication.

First, the NFC communication unit 51 as the initiator executes polling at step S51, and NFC communication unit 61 as the target receives the polling at step S52 and transmits a response to the polling to the NFC communication unit 51 at step S52.

When the response to the polling is transmitted from the NFC communication unit 61, the NFC communication unit 51 receives the response and requests an NFC ID to the NFC communication unit 61. The NFC communication unit 61 receives the request for the NFC ID from the NFC communication unit 51 and transmits the NFC ID thereof to the NFC communication unit 51 in response to the request. The NFC communication unit 51 receives the NFC ID from the NFC communication unit 61 and specifies the NFC communication unit 61 (communication apparatus 2) as a communication opponent by the NFC ID. Note that the request for the NFC ID transmitted from the NFC communication unit 51 to the NFC communication unit 61 includes the NFC ID of the NFC communication unit 51, and the NFC communication unit 61 specifies the NFC communication unit 51 (communication apparatus 1) as a communication opponent by the NFC ID.

Thereafter, mutual authentication is executed between the NFC communication units 51 and 61 by transmitting data for mutual authentication therebetween at step S55, and further a transaction ID and a transaction key are exchanged at the time. Thereafter, data is transmitted between the NFC communication units 51 and 61 after it is encrypted using the transaction ID and the transaction key as a cryptographic key. Note that the mutual authentication may be skipped (may not be executed) as described above.

When the mutual authentication is succeeded at step S55, the NFC communication unit 51 goes to step S56 at which it transmits a request for available protocol information that is can be used by the communication apparatus 2 (AVAILABLE_MEDIA Request) to the NFC communication unit 61, and the NFC communication unit 61 receives the request. At step S57, the NFC communication unit 61 transmits the available protocol information that can be used by the communication apparatus 2 (AVAILABLE_MEDIA Response) to the NFC communication unit 51, and the NFC communication unit 51 receives the available protocol information.

In this case, the NFC communication unit 51 recognizes that the communication apparatus 2 can execute the BT communication from the available protocol information received from the NFC communication unit 61.

It is assumed that the communication apparatus 1 determines to switch the NFC communication to the BT communication because the transmission rate of the BT communication is higher than that of the NFC communication and thus the BT communication is more advantageous than the NFC communication to transmit a large amount of data between the communication apparatuses 1 and 2.

In this case, at step S58, communication information necessary to the BT communication is exchanged between the NFC communication units 51 and 61. The communication information necessary to the BT communication includes, for example, Bluetooth Device (BD) address for specifying a communication opponent in the BT communication. That is, the BT communication unit 52 of the communication apparatus 1 and the BT communication unit 62 of the communication apparatus 2 have unique BD addresses, respectively, and the BD address of the BT communication unit 52 is transmitted from the NFC communication unit 51 to the NFC communication unit 61, and the NFC communication unit 61 receives the BD address at step S58. Further, at step S58, the BD address of the BT communication unit 62 is transmitted from the NFC communication unit 61 to the NFC communication unit 51, and the NFC communication unit 51 receives the BD address.

Thereafter, the NFC communication unit 51 transmits a request for switching the NFC communication to the BT communication (MEDIA_HANDOVER Request) to the NFC communication unit 61, and the NFC communication unit 61 receives the switching request at step S59. Then, the BT communication unit 52 transmits a response (MEDIA_HANDOVER Response) to the switching request from the NFC communication unit 51, and the NFC communication unit 51 receives the response at step S60.

Thereafter, the communication apparatus 1 switches (handovers) the NFC communication executed by the NFC communication unit 51 to the BT communication executed by the BT communication unit 52 at step S61. Further, the communication apparatus 2 also switches (handovers) the NFC communication executed by the NFC communication unit 61 to the BT communication executed by the BT communication unit 62 at step S62.

The NFC communication units 51 and 61 terminate the NFC communication at step S63. Thereafter, at step S64, the BT communication is executed between the BT communication units 52 and 62 based on the communication information exchanged at step S58.

That is, the BT communication unit 52 executes the BT communication by specifying the BT communication unit 62 as a communication opponent by the BD address of the BT communication unit 62 received by the NFC communication unit 51 at step S58. Likewise, the BT communication unit 62 also execute the BT communication by specifying the BT communication unit 52 as a communication opponent by the BD address of the BT communication unit 52 received by the NFC communication unit 61 at step S58.

Accordingly, in this case, the BT communication units 52 and 62 can execute the BT communication by specifying the communication opponents without the designation of the communication opponents executed by a user.

More specifically, when there are many BT devices capable of executing the BT communication, the respective BT devices transmits information between them and the other BT devices and collect information as to the other BT devices. In the respective BT devices, icons showing the other BT devices are displayed on screens based on the collected information. In this case, when the user intends to transmit data from one BT device #1 of the many BT devices to other one BT device #2, the user must designate the BT device #2 as a communication opponent to which the data is transmitted by searching the icon of the BT device #2 from the icons of the many BT devices displayed on the screen of the BT device #1 and manipulating the icon.

In contrast, according to the communication system of FIG. 1, when there exist many communication apparatuses similar to the communication apparatuses 1 to 3, even if it is intended to transmit data from the communication apparatus 1 to the communication apparatus 2, the data can be transmitted from the communication apparatus 1 to the communication apparatus 2 only by approaching the communication apparatus 1 to the communication apparatus 2.

More specifically, in the communication apparatuses 1 and 2, when they approach each other, it is recognized that the communication apparatuses 1 and 2 make the BT communication by the NFC communication, and a BD address and the like as information necessary to the BT communication are exchanged between the communication apparatuses 1 and 2. Further, in the communication apparatuses 1 and 2, the NFC communication is switched (handovered) to the BT communication, and the BT communication is executed by specifying the communication opponent based on the BD address.

Accordingly, the user can acquire the advantages of both the NFC communication and the BT communication.

More specifically, when, for example, the transmission rate of the BT communication is higher than that of the NFC communication, the user only approaches the communication apparatuses 1 and 2 each other and need not execute a job for specifying other communication opponent and further can transmit data at high speed by BT communication.

Next, a series of the processings described above may be executed by dedicated hardware or may be executed by software. When the series of processings is executed by the software, a program constituting the software is installed on a general-purpose computer, a microcomputer, and the like.

Figure 17:
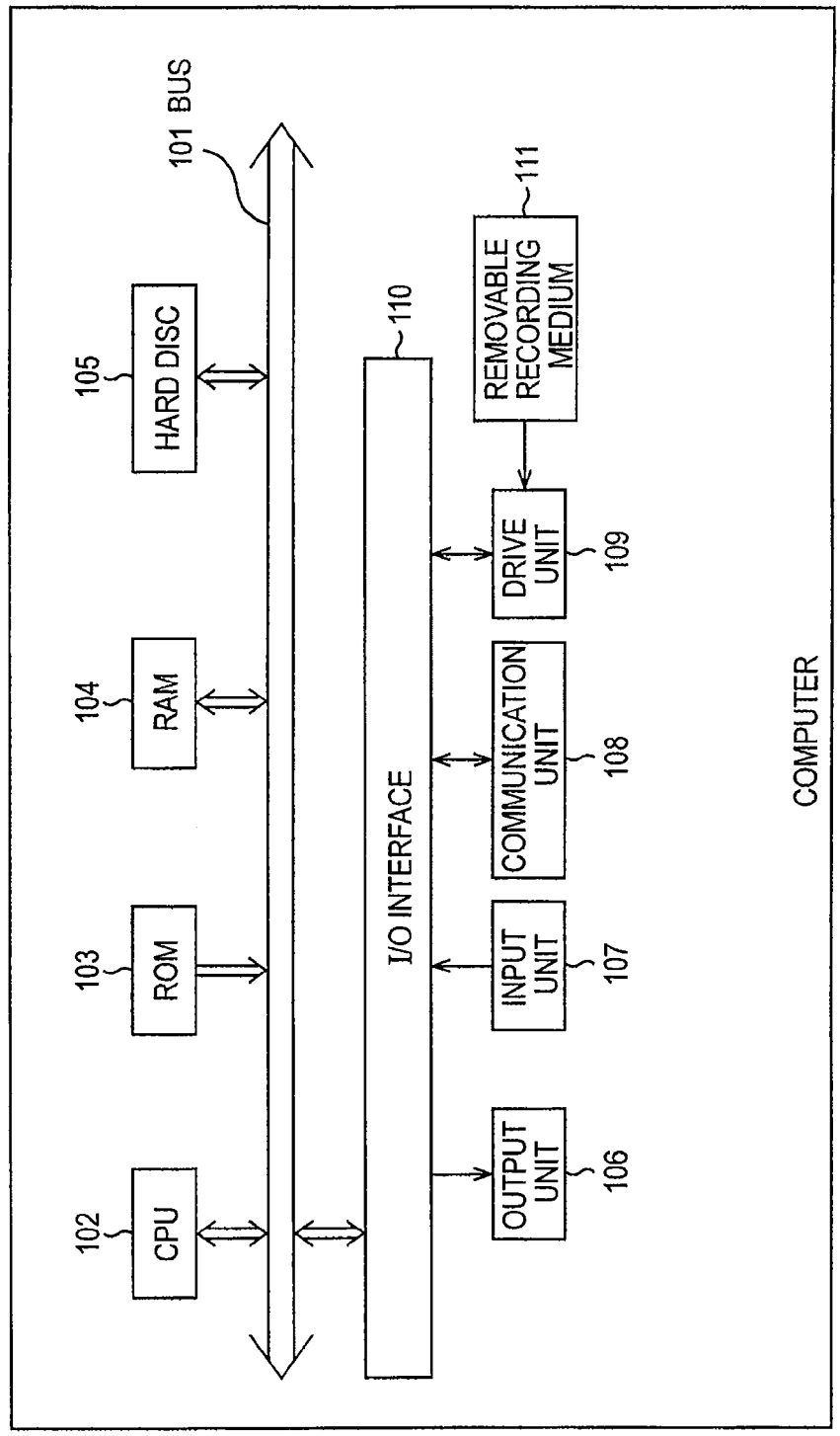
FIG. 17 is a block diagram showing an example of an arrangement of an embodiment of a computer.

FIG. 17 shows an example of an arrangement of a computer on which a program for executing the series of processings is installed.

The program can be previously recorded in a hard disc 105 and a ROM 103 as a recording medium built in the computer.

Otherwise, the program may be temporarily or permanently stored (recorded) in a removable recording medium ill such as a flexible disc, compact disc read only memory (CD-ROM), magneto optical (MO) disc, digital versatile disc (DVD), magnetic disc, semiconductor memory, and the like. The removable recording medium 111 as described above can be provided as so-called package software.

It should be noted that the program may be transmitted from a download site to the computer by wireless through a digital broadcasting artificial satellite or to the computer through a fixed-line network such as Local Area Network (LAN), the Internet, and the like, and the computer may receive the thus transferred program by a transmission unit 108 and install it on the hard disc 105 built therein, in addition to that the program is installed on the computer from the removable recording medium ill as described above.

The computer has a central processing unit (CPU) 102 built therein. An input/output interface 110 is connected to the CPU 102 through a bus 101, and when a command is input to the CPU 102 through the input/output interface 110 by a user who manipulates an input unit 107 composed of a keyboard, mouse, microphone, and the like, the CPU 102 executes the program stored in the read only memory (ROM) 103. Otherwise, the CPU 102 loads the program, which is stored in the hard disc 105, the program, which is transferred from the satellite or the network, received by the transmission unit 108, and installed to the hard disc 105, or the program, which is read out from the removable recording medium 111 mounted on a drive 109 and installed to the hard disc 105, to a random access memory (RAM) 104 and executes it. With the above operation, the CPU 102 executes processing according to the flowchart described above or processing according to the arrangement of the block diagram. Then, the CPU 102 outputs a result of the processing from an output unit 106 composed of a speaker and the like through the input/output interface 110 or transmits it from the transmission unit 108 and further records it to the hard disc 105.

In the specification, a processing step for describing the program for causing the computer to execute various types of processings need not always be processed in time series according to a sequence described in the flowchart and includes processings executed in parallel or individually (for example, parallel processings or processings executed by an object).

Further, the program may be processed by a single computer or may be processed discretely by a plurality of computers.

Note that, the embodiment is applied to a wireless communication, but may be also applied to a cable communication and to a mixed communication of the wireless communication and the cable communication.

Further, although the NFC communication is switched to a communication by other communication protocol in the embodiment, it is also possible to switch a communication by an arbitrary communication protocol to a communication by other arbitrary communication protocol, that is, to switch, for example, ISO/IEC 14443-3 to Bluetooth, and the like.

Further, although the NFC communication is switched to the BT communication in the embodiment, it is also possible to further switch the BT communication to a communication by another communication protocol thereafter.

As described above, according to the embodiments, there can be executed a communication which can acquire the advantages of a plurality of communication protocols.

It should be understood by those skilled in the art that various modifications, combinations, sub-combinations and alterations may occur depending on design requirements and other factors insofar as they are within the scope of the appended claims or the equivalents thereof.

The application is claimed as follows:

1. A communication apparatus comprising:
   a first communication unit configured to send a random number and first communication information including first identification information of the communication apparatus to a second communication apparatus, and to receive second communication information including second identification information of the second communication apparatus necessary to a second communication from the second communication apparatus by using near field communication; and
   a second communication unit configured to perform the second communication between the communication apparatus and the second communication apparatus by using the second communication information received by the first communication unit,
   wherein the first communication unit is configured to (i) detect whether a RF field is present during a waiting phase that lasts for a first period of time and (ii) output a near field communication request to initiate communication with the second communication apparatus after the waiting phase ends, during a second period of time that occurs as a next period of time after the first period of time, based on no RF field being detected during the waiting phase.

2. The communication apparatus of claim 1, wherein the first communication unit is configured to perform the near field communication with the second communication apparatus when the second communication apparatus is located in a vicinity of the communication apparatus.

3. The communication apparatus of claim 2, wherein a transmission rate of the second communication unit is higher than that of the first communication unit.

4. The communication apparatus of claim 1, wherein the first communication unit is further configured to receive available protocol information indicative of a communication protocol which is available by the second communication apparatus.

5. The communication apparatus of claim 4, wherein the second communication corresponds to the available protocol information received by the first communication unit.

6. The communication apparatus of claim 5, wherein the second communication is a Bluetooth communication.

7. The communication apparatus of claim 5, wherein the second communication is a WLAN communication.

8. The communication apparatus of claim 1, wherein the communication apparatus is configured to specify the second communication apparatus according to the second identification information in the second communication.

9. The communication apparatus of claim 8, wherein the communication apparatus is specified by the second communication apparatus according to the first identification information in the second communication.

10. A communication method comprising:
  detecting whether a RF field is present during a waiting phase that lasts for a first period of time, and outputting, by a communication apparatus, a near field communication request to initiate communication with a second communication apparatus after the waiting phase ends, during a second period of time that occurs as a next period of time after the first period of time, based on no RF field being detected during the waiting phase;
  sending a random number and first communication information including first identification information of the communication apparatus to the second communication apparatus by using near field communication;
  receiving second communication information including second identification information of the second communication apparatus necessary to a second communication from the second communication apparatus by using near field communication; and
  performing the second communication between the communication apparatus and the second communication apparatus by using the second communication information received by using the near field communication.

11. A communication apparatus comprising:
  a first communication unit configured to receive a random number and first communication information including first identification information of a second communication apparatus from the second communication apparatus and send second communication information including second identification information of the communication apparatus necessary to a second communication to the second communication apparatus by using near field communication; and
  a second communication unit configured to perform the second communication between the communication apparatus and the second communication apparatus by using the first communication information received by the first communication unit,
  wherein the first communication unit is configured to (i) detect whether a RF field is present during a waiting phase that lasts for a first period of time and (ii) output a near field communication request to initiate communication with the second communication apparatus after the waiting phase ends, during a second period of time that occurs as a next period of time after the first period of time, based on no RF field being detected during the waiting phase.

12. The communication apparatus of claim 11, wherein the first communication unit is configured to perform the near field communication with the second communication apparatus when the second communication apparatus is located in a vicinity of the communication apparatus.

13. The communication apparatus of claim 12, wherein a transmission rate of the second communication unit is higher than that of the first communication unit.

14. The communication apparatus of claim 11, wherein the first communication unit is further configured to send available protocol information indicative of a communication protocol which is available by the second communication apparatus.

15. The communication apparatus of claim 14, wherein the second communication corresponds to the available protocol information sent by the first communication unit.

16. The communication apparatus of claim 15, wherein the second communication is a Bluetooth communication.

17. The communication apparatus of claim 15, wherein the second communication is a WLAN communication.

18. The communication apparatus of claim 15, wherein the communication apparatus is configured to specify the second communication apparatus according to the first identification information in the second communication.

19. The communication apparatus of claim 11, wherein the communication apparatus is specified by the second communication apparatus according to the second identification information in the second communication.

20. A communication method comprising:
  detecting whether a RF field is present during a waiting phase that lasts for a first period of time, and outputting, by a communication apparatus, a near field communication request to initiate communication with a second communication apparatus after the waiting phase ends, during a second period of time that occurs as a next period of time after the first period of time, based on no RF field being detected during the waiting phase;
  receiving a random number and first communication information including first identification information of the second communication apparatus from the second communication apparatus by using near field communication;
  sending second communication information including second identification information of the communication apparatus necessary to a second communication to the second communication apparatus by using near field communication; and
  performing the second communication between the communication apparatus and the second communication apparatus by using the first communication information received by using the near field communication.

* * * * *